Patented Dec. 1, 1925.

1,563,872

UNITED STATES PATENT OFFICE.

BELA W. ROTE, OF CLEVELAND, OHIO.

PROCESS OF MANUFACTURING PLASTIC COMPOSITIONS.

No Drawing.   Application filed December 11, 1920. Serial No. 430,086.

*To all whom it may concern:*

Be it known that I, BELA W. ROTE, a citizen of the United States, resident of Cleveland, county of Cuyahoga, and State of Ohio, have invented new and useful Improvements in Processes of Manufacturing Plastic Compositions, of which the following is a specification, the principle of the invention being herein explained and the best mode in which I have contemplated applying that principle, so as to distinguish it from other inventions.

My invention relates to processes of manufacturing plastic compositions. Particularly, the invention relates to processes for manufacturing such compositions suitable for making leather substitutes which shall serve as a surfacing for cloth, duck, drills, sheetings, furniture, auto upholstery and tops, satines, silk, cravenetted cloth, wearing apparel, hats, caps, shoe uppers, etc. Furthermore, the leather substitutes made from the compositions manufactured by my new and improved process will serve, without any backing, as material for automobile fans, straps, belts, belting, travelling bags, suit cases, gaskets, packages, mechanical specialties, matting, floor coverings, shoe heel lifts, shoe soles, etc. The object of the process is to manufacture plastic compositions which shall have a high tensile strength, great durability, be non-brittle and water proof, and, compared to the strength, be of light weight.

The following description sets forth in detail certain steps exemplifying my improved process, such steps illustrating one way in which the process may be carried out.

I first dissolve a minor portion of rubber in benzol or its equivalent. One example of such equivalent is gasolene of seventy (70) Baumé or over. I then saturate a major portion of cotton or its equivalent with the rubber solution. The cotton or its equivalent is a fibre material which is essentially wear-resisting and non-elastic and may be high or low grade. Depending upon the final product which is desired, the cotton may be cotton fiber, of a high or low order, or waste or scrap leather, or waste or scrap jute, or a combination of the same. Also dependent upon the final product desired, the rubber may be pure Pará, or smoked sheets, which is a refined rubber, or crêpe, which is plantation rubber and less dense than sheets, or coarse rubber, which is a second or third grade raw rubber, or reclaimed rubber, which is any grade being subjected to its second or third use. Companion applications for U. S. Letters Patent upon new and improved plastic compositions, filed concurrently herewith, Serial Numbers 430,083, 430,084, and 430,085, severally describe and claim the various products obtained by utilizing the various grades of cotton fiber, etc., above outlined, and the various grades of rubber above outlined; as also, describe and claim certain various filling, pigment and vulcanizing materials hereinafter mentioned in the description of this application.

By a minor portion of rubber, I mean substantially one part by weight to four parts of the fiber, or its equivalent. The mixture of rubber and cotton is dried thoroughly of the contained moisture, and the same is preferably effected by a vacuum drying process, this drying operation effecting a very efficient binding and assimilating action by and between the several elements. The heat to which the vacuum dryer is subjected will vary according to the time that is allowed for the drying. The dried product is then warmed and compressed preferably by rolls, filling, pigment and vulcanizing material being added during the pressing or rolling operation. These last-mentioned materials are added also in a minor portion, the aggregate of the same being substantially by weight equal to the weight of the rubber. Dependent upon the nature of the desired product, the filling, pigment and vulcanizing material will vary, both as to its ingredients and the relative proportions of the same. For instance, supposing seventy (70) parts of cotton or its equivalent to have been utilized, and fifteen (15) parts of pure Pará rubber, filling, pigment and vulcanizing material would consist of five (5) parts litharge, five (5) parts magnesia, three (3) parts gloss black or lamp-black, and two (2) parts pure sulphur. These ingredients will produce a high-grade black plastic composition which forms the subject matter of one of the companion applications above mentioned, being Serial No. 430,083.

After the filling, pigment and vulcanizing material has been compressed or rolled into the cotton-rubber mixture, as above outlined, the resultant product is sheeted to the desired thickness and cured in a flat plate vulcanizing press. The vulcanized product is then buffed on one side whereby the fiber ends or nap is raised, and to this raised surface is applied a coating such as cement, which is capable of taking an impression of the desired leather graining or figures or imprints.

The method of thus applying the graining or figures or imprints to the impressionable or cement coating, forms no part of this invention.

The claims of this application are limited to my new and improved process of manufacturing plastic compositions and are not presented so as to cover the new and improved process of manufacturing artificial leather.

What I claim is:

1. In a process of manufacturing plastic compositions, the steps which consist, in dissolving a minor portion by weight of rubber; saturating a major portion of cotton fibre with the rubber solution; removing the solvent; compressing filling, pigment and vulcanizing material into the dried mixture of cotton and rubber; and then vulcanizing.

2. In a process of manufacturing plastic compositions, the steps which consist, in dissolving a minor portion by weight of rubber; saturating a major portion of cotton fibre with the rubber solution; removing the solvent by a vacuum drying process; compressing filling, pigment and vulcanizing material into the dried mixture of cotton and rubber; and then vulcanizing.

3. In a process of manufacturing plastic compositions, the steps which consist, in dissolving a minor portion by weight of rubber; saturating a major portion of cotton fibre with the rubber solution; removing the solvent; rolling filling, pigment and vulcanizing material into the dried mixture of cotton and rubber; and then vulcanizing.

4. In a process of manufacturing plastic compositions, the steps which consist, in dissolving ten (10) to twenty-five (25) parts by weight rubber in benzol; saturating fifty-five (55) to seventy-five (75) parts cotton with the rubber solution; removing the solvent; compressing fifteen (15) to twenty (20) parts filling, pigment and vulcanizing material into the dried mixture of cotton and rubber; and then vulcanizing.

5. In a process of manufacturing plastic compositions, the steps which consist, in dissolving ten (10) to twenty-five (25) parts by weight rubber in benzol; saturating fifty-five (55) to seventy-five (75) parts cotton with the rubber solution; removing the solvent by a vacuum drying process; compressing fifteen (15) to twenty (20) parts filling, pigment and vulcanizing material into the dried mixture of cotton and rubber; and then vulcanizing.

6. In a process of manufacturing plastic compositions, the steps which consist, in dissolving substantially fifteen (15) parts by weight rubber in benzol; saturating substantially sixty-five (65) parts cotton with the rubber solution; removing the solvent; compressing substantially twenty (20) parts filling, pigment and vulcanizing material into the dried mixture of cotton and rubber; and then vulcanizing.

7. In a process of manufacturing plastic compositions, the steps which consist, in dissolving substantially fifteen (15) parts by weight rubber in benzol; saturating substantially sixty-five (65) parts cotton with the rubber solution; removing the solvent by a vacuum drying process; compressing substantially twenty (20) parts filling, pigment and vulcanizing material into the dried mixture of cotton and rubber; and then vulcanizing.

Signed by me this 25th day of November, 1920.

BELA W. ROTE.